United States Patent [19]

Yoshida

[11] 3,869,723

[45] Mar. 4, 1975

[54] MAGNETIC RECORDING AND REPRODUCING APPARATUS HAVING DUAL CAPSTANS FOR USE WITH CASSETTES

[75] Inventor: Kenji Yoshida, Tokyo, Japan

[73] Assignee: Sony Corporation, Tokyo, Japan

[22] Filed: June 2, 1972

[21] Appl. No.: 259,024

[30] Foreign Application Priority Data

June 7, 1971 Japan ............................... 46-47868

[52] U.S. Cl. .................... 360/96, 242/199, 360/105

[51] Int. Cl.... G11b 15/29, G11b 5/54, G11b 23/04

[58] Field of Search ............ 360/96, 105, 118, 130; 242/192, 199–202, 210, 157 R; 226/49–50

[56] References Cited

UNITED STATES PATENTS

| | | | |
|---|---|---|---|
| 3,667,701 | 6/1973 | Blum | 360/96 |
| 3,716,242 | 2/1973 | Maruyama | 360/105 |
| 3,767,137 | 10/1973 | Richt et al. | 360/96 |
| 3,800,327 | 3/1974 | Okita et al. | 360/118 |

*Primary Examiner*—Alfred H. Eddleman
*Attorney, Agent, or Firm*—Lewis H. Eslinger; Alvin Sinderbrand

[57] ABSTRACT

In a magnetic recording and reproducing apparatus of the dual capstan type, that is, in which a magnetic tape preferably contained in a cassette is driven simultaneously by two spaced apart drive assemblies each constituted by a rotated drive shaft or capstan and a pinch roller movable against the capstan, for example, through the usual window of the cassette, at least one magnetic recording head and at least one magnetic reproducing head are located between the two drive assemblies for respectively recording and reproducing signals on the tape as the latter is transported by the drive assemblies, and at least one magnetic erasing head is mounted adjacent the pinch roller of one of the drive assemblies, at the side of that pinch roller facing away from the other drive assembly, and is movable with the adjacent pinch roller for engaging the tape through the same window of the cassette.

17 Claims, 10 Drawing Figures

MAGNETIC RECORDING AND REPRODUCING APPARATUS HAVING DUAL CAPSTANS FOR USE WITH CASSETTES

This invention relates generally to magnetic recording and reproducing apparatus, and more particularly is directed to improved magnetic recording and reproducing apparatus preferably adapted for use with a tape cassette, and which is provided with a stabilized or dual-capstan tape drive and with means for monitoring signals recorded on the tape during a recording operation.

It has been proposed to provide a cassette type magnetic recording and reproducing apparatus in which two fly wheels driven by a single belt from a pulley on an electric motor shaft are selectively coupled with take-up and supply reel drive shafts for driving one or the other of the reels within the cassette in the direction for winding the tape thereon, and the fly-wheels on both provided with extended shafts which project into the cassette to constitute two spaced apart, rotated capstans for simultaneously driving or transporting the tape when the latter is pressed against the capstans by respective pinch rollers. The foregoing arrangement achieves a particularly stabilized drive of the tape and a constant tension in the tape at the portion of the latter extending between the two simultaneously rotated capstans so that signals may be recorded and reproduced on such portion of the tape with a desirably high fidelity.

Standardized magnetic tape cassettes of the so-called Philips or compact type have a generally rectangular housing containing supply and take-up reels in side-by-side relation with the tape between the reels being guided at the inside of one of the relatively long side edge walls of the housing for exposure at five windows provided therein. Heretofore, in an apparatus having a dual-capstan drive, two of the windows in the standard cassette were required to accommodate the pinch rollers associated with the two capstans or drive shafts, and the remaining three windows of the standard cassette were respectively required to permit the engagement with the tape of an erasing head, a recording head and a reproducing or playback head arranged in the order named considered in the direction of movement of the tape between the two capstans. If the signals recorded on the tape are to be monitored simultaneously with the recording of the signals, it is apparent that the reproducing or playback head must follow the recording head considered in the direction of movement of the tape during recording. Thus, the described existing arrangement is suitable for providing both a dual-capstan drive of the tape and monitoring of the signals being recorded on the tape within a standard cassette only if recording is effected during the driving of the tape in one direction. However, if recording of signals on the tape and the monitoring of such signals are to be achieved during the driving of the tape in either direction, the heretofore proposed arrangement of the dual-capstan drive and erasing, recording and reproducing heads cannot be employed in connection with the standard cassettes having only five windows in a relatively long edge wall thereof.

Accordingly, it is an object of this invention to provide a magnetic recording and reproducing apparatus for use with standard cassettes, and which has an improved arrangement of a dual capstan drive and erasing, recording and reproducing heads by which there is achieved the stabilized transportation of the tape in the cassette and the possibility of monitoring the recorded signals during the recording thereof.

Another object is to provide a magnetic recording and reproducing apparatus, as aforesaid, in which the dual-capstan drive for the tape is combined with erasing, recording and reproducing heads in an arrangement by which monitoring of the recorded signals is made possible during the recording of the tape being driven in either direction within a standard cassette.

A further object is to provide a magnetic recording and reproducing apparatus with a relatively simple arrangement of the pinch rollers associated with the capstans of a dual-capstan drive and of erasing, recording and reproducing heads for making possible the monitoring of recorded signals during the recording thereof on the tape in a standard cassette while the tape is being driven in either direction.

In accordance with an aspect of this invention, an apparatus for magnetically recording and reproducing signals on a magnetic tape, particularly contained in a standard cassette, comprises first and second rotatable drive shafts or capstans which extend into the cassette adjacent to respective windows of the latter through which first and second pinch rollers are movable to engage the tape against the respective drive shafts, at least one magnetic recording head and at least one magnetic reproducing head located between the pinch rollers and engageable with the tape through two other windows of the cassette for respectively recording and reproducing signals on the tape as the latter is transported by the drive shafts or capstans, and at least one magnetic erasing head carried by the mounting means of one of the pinch rollers immediately adjacent to the latter at the side thereof facing away from the other pinch roller so that the erasing head is engageable with the tape through the same window of the cassette as the adjacent pinch roller simultaneously with the movement of the latter against the respective capstan.

By reason of the foregoing arrangement according to this invention, in the case of an apparatus intended for recording during transport of the tape in either direction, an erasing head is associated with each of the pinch rollers and, in between the two pinch rollers, there are provided either two recording heads and a single reproducing head therebetween, or two reproducing heads and a single recording head therebetween, and the heads rendered operative during recording of signals on the tape being transported in either direction are selected so that the tape, considered in the direction of its movement or transport, successively passes operative erasing, recording and reproducing heads.

The above, and other objects, features and advantages of the invention, will be apparent in the following detailed description of illustrative embodiments thereof which is to be read in connection with the accompanying drawings, wherein.

and

Figure 8A:
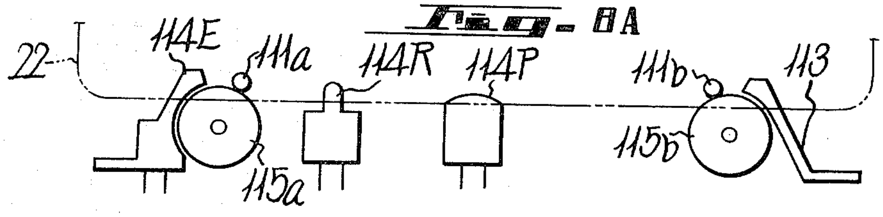
Figure 8B:
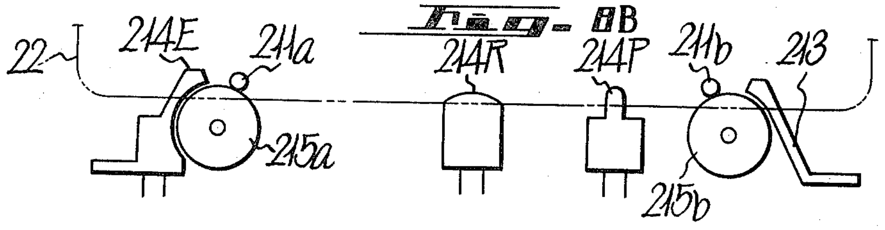
Figure 8C:
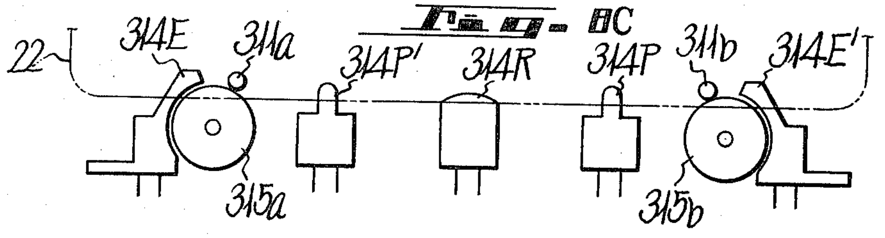

FIGS. 8A, 8B and 8C are schematic plan views illustrating the arrangements of erasing, recording and reproducing heads in other respective embodiments of the invention.

Figures 1, 2, 3:
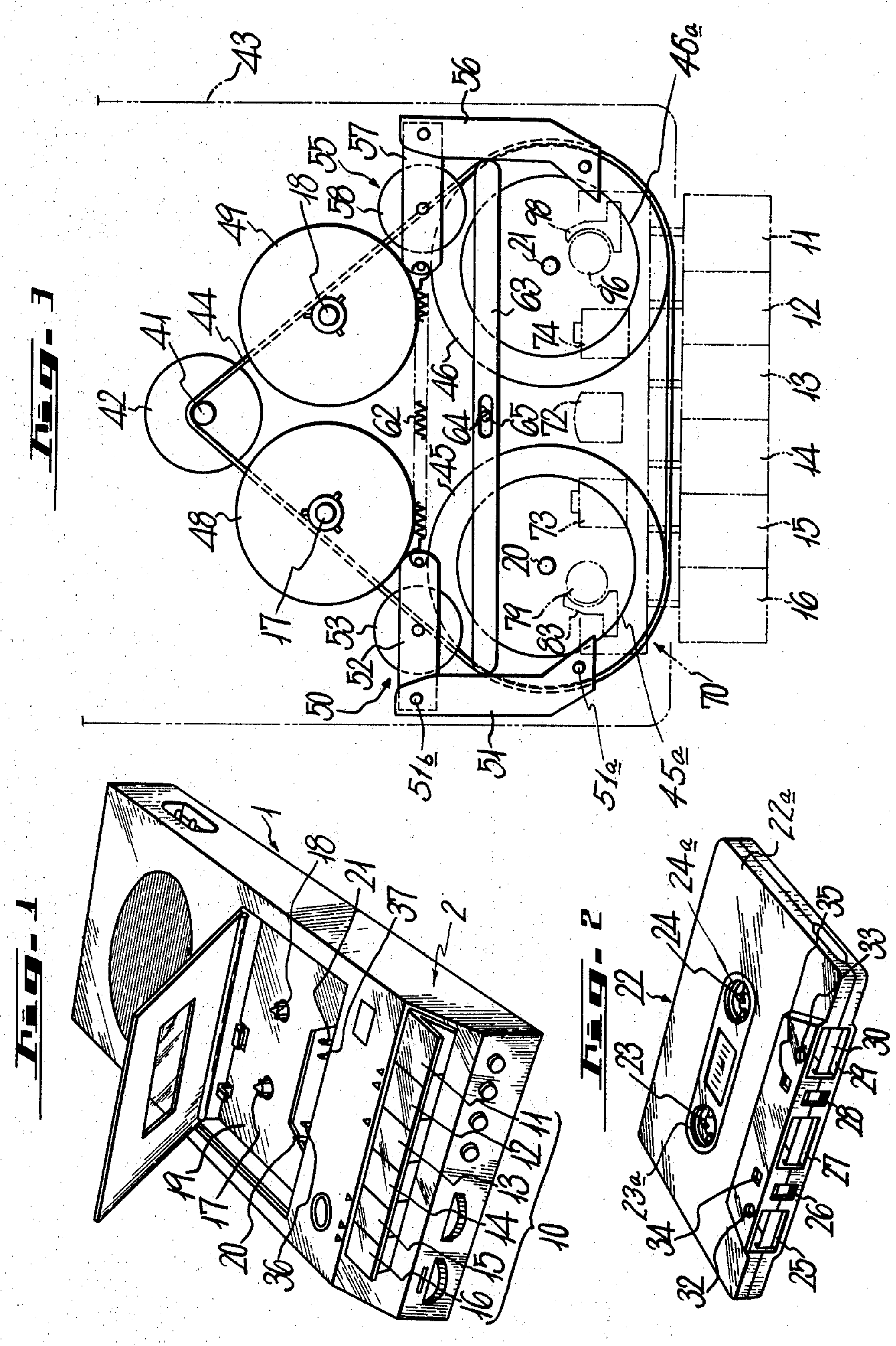
FIG. 1 is a perspective view of a magnetic recording and reproducing apparatus according to this invention.
FIG. 2 is an enlarged perspective view of a tape cassette of a standard type that may be used in the apparatus according to this invention.
FIG. 3 is a schematic top plan view of a drive assembly included in the apparatus according to this invention.

Referring to the drawings in detail, and initially to FIG. 1 thereof, it will be seen that a magnetic recording and reproducing apparatus 1 according to this invention may include a casing 2 provided with a recess or cavity 19 forming a holder for receiving and positioning a tape cassette 22 (FIG. 2).

The cassette 22 is shown to be of a standard type which includes a generally rectangular, substantially flat housing 22*a* containing a tape 30 which is wound on reels 23 and 24 that are arranged side-by-side, and freely rotatable within the housing. As is usually the case, the opposite ends of tape 30 may be secured to reels 23 and 24, respectively, and the tape extending between the reels is directed by guides within cassette housing 22*a* so as to travel along one of the relatively long side edge walls of the cassette housing in which five spaced apart windows 25, 26, 27, 28 and 29 are provided for exposure of the tape. As shown, the central window 27 and the end windows 25 and 29 may be substantially of the same relatively large size, while the intermediate windows 26 and 28 are of substantially the same relatively small size. Further, the windows 25 and 26 and the windows 28 and 29 are shown to be symmetrically arranged with respect to the central window 27. The top and bottom walls of cassette housing 22*a* are also shown to have the usual openings 23 *a* and 24*a* registering with the hubs of reels 23 and 24, and a pair of apertures 32 and 33 arranged adjacent windows 25 and 29, respectively, and a further pair of apertures 34 and 35 arranged adjacent windows 26 and 28.

For use with the above described standard cassette 22, the apparatus 1 according to this invention has reel drive shafts 17 and 18 projecting upwardly into cavity 19 so as to extend into openings 23*a* and 24*a* and engage the hubs of reels 23 and 24 when cassette 22 is received and positioned in cavity 19. Apparatus 1 is further shown to have first and second rotatable tape drive shafts or capstans 20 and 21 projecting upwardly in cavity 19 and being laterally spaced apart so as to be received in apertures 32 and 33, respectively, of the cassette when the latter is received in cavity 19 and accurately positioned by means of locating pins 36 and 37 which project upwardly within cavity 19 and are received in apertures 34 and 35 of the cassette.

The apparatus 1 is further shown to have a control assembly 10 including push buttons 11, 12, 13, 14, 15 and 16 that are manually actuable to select respective operating modes of apparatus 1. For example, when a cassette 22 is located within cavity or holder 19, manual depressing of control pushbutton 13 may be made effective to cause the normal or relatively slow speed advancement of the tape in the forward direction, that is, in the direction unwinding the tape from reel 23 and winding up the tape on reel 24, as during the playback or reproducing of signals previously recorded on the tape, or during the recording of signals on the tape, which recording mode of operation may be achieved by the simultaneous actuation of pushbuttons 11 and 13. Similarly, pushbutton 15 may be made effective to control the normal or relatively slow speed advancement of the tape in the reverse direction, that is, in the direction unwinding the tape from reel 24 and winding up the tape on reel 23, as during the playback or reproducing of signals previously recorded on the tape, or during the recording of signals on the tape being driven in the reverse direction, which recording mode of operation may be achieved by the simultaneous actuation of pushbuttons 11 and 15. Further, pushbuttons 12 and 16 may be made effective to control the fast forward movement and the fast reverse movement, respectively, of the tape, whereas the pushbutton 14 may be employed for halting the tape drive at any desired time during any of the selected operating modes of apparatus 1.

Referring now to FIG. 3, it will be seen that, in the apparatus 1, the drive for reel drive shafts 17 and 18 and capstans 20 and 21 may include a single reversible electric motor 42 suitably mounted on a chassis 43 within housing 2 and having a pulley 41 on the motor shaft which drives a single belt 44 which extends around the grooved peripheries of fly wheels 45 and 46. The drive shafts 20 and 21 constituting capstans are respectively secured to, or integral with fly wheels 45 and 46 and are suitably journalled in chassis 43 so as to be both rotated in the same direction as the shaft of motor 42. The reel drive shafts 17 and 18 are respectively secured to drive wheels 48 and 49 rotatably mounted on chassis 43 at the same level as drive wheels 45*a* and 46*a* which are rotatable with fly wheels 45 and 46, respectively. First and second idler assemblies 50 and 55 are provided for selectively driving wheel 48 and shaft 17 and wheel 49 and shaft 18 from drive wheels 45*a* and 46*a*, respectively. As shown, idler assembly 50 includes a lever 51 pivotally mounted at its forward end, as at 51*a*, on chassis 43 and having an idler support arm 52 pivotally connected, as at 51*b*, to the rear end of lever 51 and extending inwardly from the latter. An idler wheel 53 is rotatably supported by arm 52 so that, in response to swinging of lever 51, idler wheel 53 is movable toward the right from its illustrated inoperative position on FIG. 3 into peripheral engagement with wheels 45*a* and 48. Similarly, the idler assembly 55 includes a lever 56 pivotally mounted, at its forward end, on chassis 43, and having its free rear end pivotally connected to an idler support arm 57 which extends inwardly from lever 56 and rotatably carries an idler wheel 58. In response to swinging of lever 56, idler wheel 58 is movable toward the left from the inoperative position shown on FIG. 3 into peripheral engagement with wheels 46*a* and 49. A tension spring 62 is connected between the inner ends of idler support arms 52 and 57 so as to hold levers 51 and 56 against the opposite ends of a laterally extending control rod 63. The control rod 63 has a central opening 64 which receives a pin 65 that is suitably displaced in response to actuation of control assembly 10. Thus, for example, when pushbutton 13 is depressed for selecting the normal or relatively slow forward operation, pin 65 is displaced toward the left, as viewed on FIG. 3, with the result that levers 51 and 56 are both turned in the counterclockwise direction to move idler wheel 53 further away from the associated wheels 45*a* and 48, while idler wheel 58 is moved into engagement with wheels 46*a* and 49, whereby to drive reel drive shaft 18. Thus, if electric motor 42 has its shaft rotated in the counterclockwise direction when operated in the forward direction in response to actuation of pushbutton 13, then capstans 20 and 21 and also reel drive shaft 18 are rotated in the counterclockwise direction upon the selection of the normal forward operation. On the other hand, when normal or relatively slow speed operation in the reverse direction is selected by actuation of pushbutton 15, the direction of rotation of motor 42 is reversed and control rod 63 is displaced toward the right. Accordingly, capstans 20 and 21 are then rotated in the closkwise direction and idler wheels 53 and 58 are displaced toward the right from the illustrated positions to engage idler wheel 53 with wheels 45*a* and 48 so that reel drive shaft 17 is also rotated in the clockwise direction.

As shown schematically in broken lines on FIG. 3, a head carriage assembly 70 is mounted on the forward portion of chassis 43. The carriage assembly 70 is shown on FIGS. 4 and 5 to include a carriage or base plate 71 which is slidable in the fore and aft direction on chassis 43 under the influence of control assembly 10. More particularly, suitable conventional mechanism which is not shown and which forms no part of this invention, may be provided for positioning carriage 71 in its inoperative forward position shown on FIG. 4 upon actuation of any one of the fast forward pushbutton 12, stop pushbutton 14 and fast reverse pushbutton 16, and for displacing carriage 71 rearwardly to its operative position shown on FIG. 5 in response to the actuation of either the normal forward pushbutton 13 or the normal reverse pushbutton 15.

Figures 4, 5:
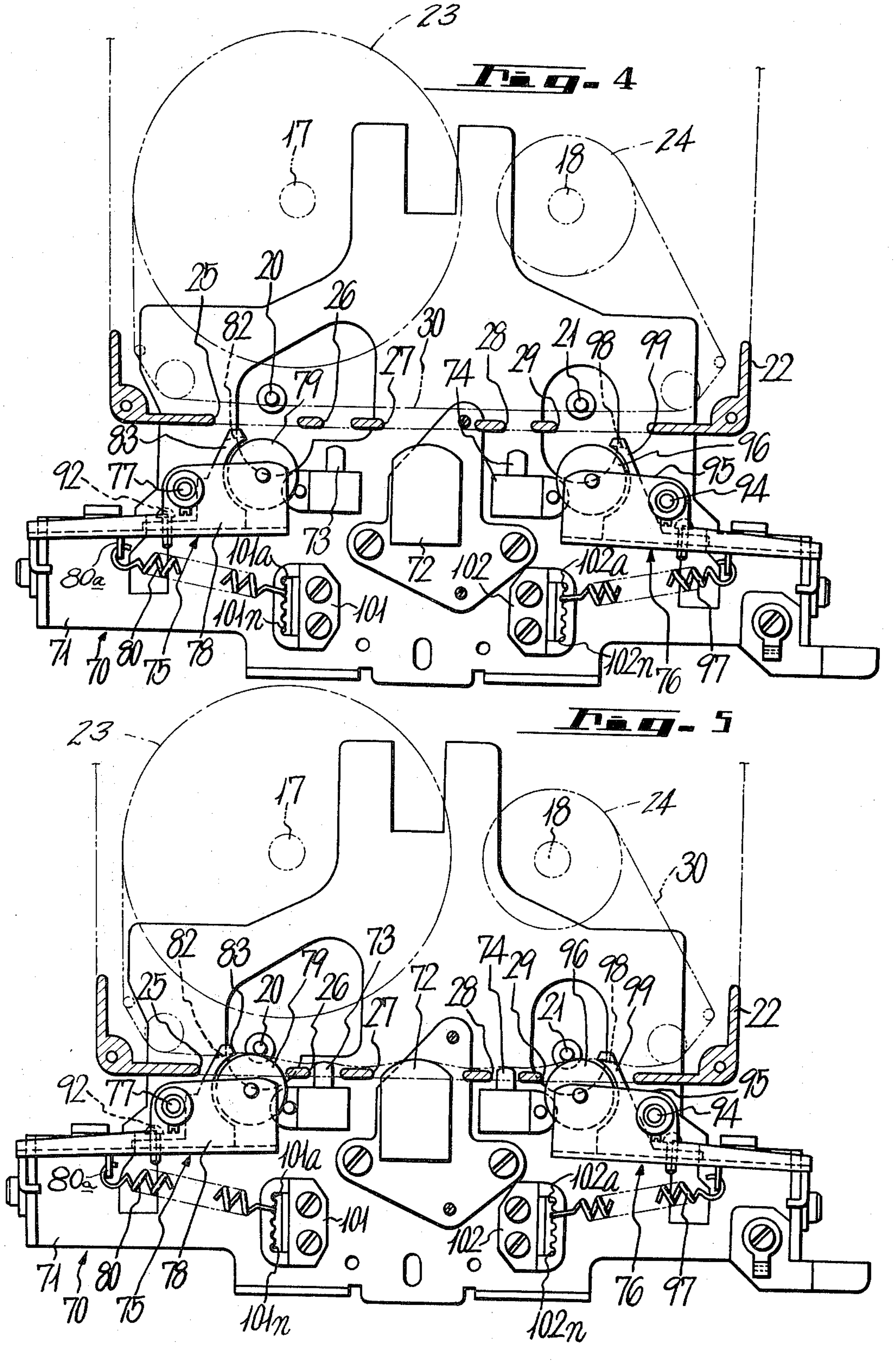
FIGS. 4 and 5 are top plan views of a carriage assembly included in the magnetic recording and reproducing apparatus according to this invention, and which respectively show the carriage assembly in its inoperative and operative positions relative to a cassette appearing partly in cross-section.

In the embodiment of the invention being described with reference to FIGS. 4 and 5, the carriage 71 has thereon a centrally located magnetic reproducing or playback head 72 which is disposed to register with the central window 27 of a cassette 22 positioned in cavity or holder 19, and first and second magnetic recording heads 73 and 74 located at opposite sides of head 72 at positions corresponding to the windows 26 and 28 of the cassette. Carriage 71 further carries first and second pinch roller assemblies 75 and 76 to cooperate with capstans 20 and 21, respectively. As shown, pinch roller assembly 75 includes a laterally extending mounting lever 78 which is pivoted, intermediate its ends, on a pivot pin 77 carried by carriage 71. A pinch roller 79 is rotatably supported at the inner end of mounting lever 78 and is positioned to register with window 25 of the cassette. A spring 80 has one end connected to an anchor tab 80*a* extending from mounting lever 78 and its other end engaged with a selected one of a series of notches or serrations 101*a*–101*n* provided along the edge of a mounting bracket 101 secured to carriage 71. Thus, spring 80 urges mounting lever 78 to turn in the counterclockwise direction, as viewed on FIGS. 4 and 5, whereby to urge pinch roller 79 rearwardly through window 25 and against the respective capstan 20 when carriage 71 is in its rearward operative position (FIG. 5). It will be apparent that the force with which pinch roller 79 is thus urged against capstan 20 can be varied by changing the selected one of the notches or serrations 101*a*–101*n* with which spring 80 is engaged.

Figures 6, 7:
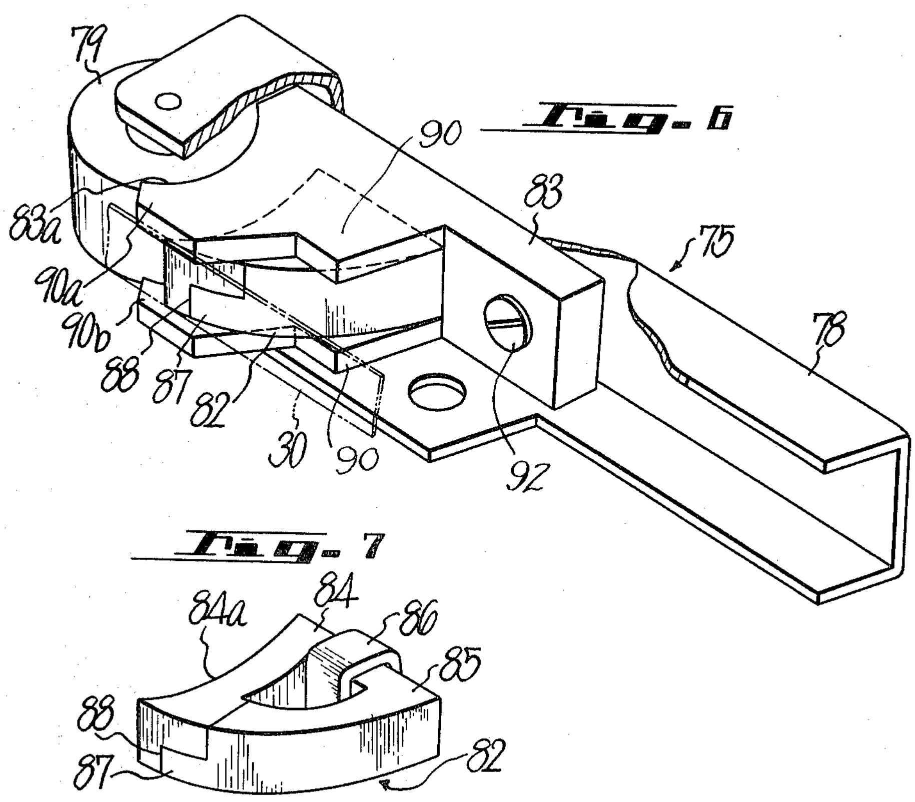
FIG. 6 is an enlarged perspective view, partly broken away and in section, of a pinch roller assembly which, in accordance with this invention, includes a magnetic erasing head.
FIG. 7 is a detail perspective view of the magnetic erasing head included in the pinch roller assembly of FIG. 6.

The pinch roller assembly 75 is further shown to have a magnetic erasing head 82 which is cemented or otherwise mounted in a head holder 83 by which erasing head 82 is protected and secured on lever 78 (FIG. 6) as by a screw 92. As shown particularly on FIG. 7, magnetic erasing head 82 includes core members 84 and 85 which are assembled together to provide a core having a winding or coil 86 thereon. The core member 84 which is at the side of the core closest to pinch roller 79, is formed with a concave, arcuate surface 84*a* which corresponds to the cylindrical peripheral surface of pinch roller 79. The erasing head 82 is shown to have a relatively narrow end portion with a curved surface 87 from which the arcuate side surface 84*a* extends to a relatively wide base portion seating on head holder 83. Ends of the core members 84 and 85 define an air gap 88 therebetween which extends across the curved end surface portion 87 adapted to be smoothly engaged by the tape immediately adjacent pinch roller 79. The head holder 83 is of generally channel-shaped configuration and has spaced webs or flanks 90 embracing and protecting erasing head 82 and tapering rearwardly to relatively narrow guiding end portions 90*a* and 90*b* projecting beyond end surface 87 of head 82 for guiding the tape 30 in contact with the erasing head. The flanks 90 of head holder 83 also have arcuate side surfaces 83*a* corresponding to the periphery of roller 79. By reason of the configuration of erasing head 82 and holder 83, the narrow end portion 87 of the erasing head and the narrow end portions 90*a* and 90*b* of the head holder can be positioned immediately adjacent to pinch roller 79 at the outer side of the latter so as to be extendable into window 25 of cassette 22 along with pinch roller 79 when the latter is moved against the respective capstan 20.

The pinch roller assembly 76 is substantially a mirror image of pinch roller assembly 75 and is shown to include a mounting lever 95 pivoted on a pin 94 carried by carriage 71 and rotatably supporting a pinch roller 96 which, when carriage 71 is in its operative position (FIG. 5) projects into window 29 and is urged against the respective capstan 21 by a spring 97 connected at one end to lever 95 and engaged, at its opposite end, with a selected one of the serrations or notches 102*a*–102*n* in a bracket 102 secured to carriage 71. The pinch roller assembly 76 further includes a magnetic erasing head 98 held in a head holder 99 secured to lever 95, with the magnetic erasing head 98 and holder 99 being similar to the previously described head 82 and holder 83. It will be apparent that, in each case, the erasing head 82 or 98 is at the side of the respective pinch roller 79 or 96, facing away from the other pinch roller 96 or 79, respectively. Thus, when carriage 71 is moved rearwardly to its operative position (FIG. 5), heads 72, 73 and 74 project into windows 27, 26 and 28, respectively, of the cassette and engage the tape 30 at the portion of the latter between capstans 20 and 21 against which the tape is pressed by pinch rollers 79 and 96, respectively, and the erasing heads 82 and 98 project with the pinch rollers 79 and 96, respectively, into windows 25 and 29 to engage the tape 30 between reel 23 and capstan 20, and between capstan 21 and reel 24.

The above described embodiment of the invention operates as follows:

With a cassette 22 in the cavity or holder 19 of apparatus 1, the actuation of the record and forward push-buttons 11 and 13 causes capstans 20 and 21 and reel drive shaft 18 to be rotated in the counterclockwise direction, and the movement of carriage 71 rearwardly to its operative position shown on FIG. 5. In such operative position of carriage 71, pinch rollers 79 and 96 extend into windows 25 and 29 and press the magnetic tape 30 against capstans 20 and 21 so that the magnetic tape is transported in the right-hand direction, that is, from capstan 20 toward capstan 21, with the tape being unwound from reel 23 and being rewound on reel 24 engaged with rotated shaft 18. In response to the actuation of the record and forward push-buttons 11 and 13, only the erasing head 82, the recording head 73 and the reproducing head 72 are made operative, while the other recording head 74 and erasing head 98 are inoperative. Accordingly, as the tape 30 is transported, any signals previously recorded thereon are removed or erased by erasing head 82 and the new or desired signals are thereafter recorded on tape 30 by recording head 73. Such new signals recorded on tape 30 are then reproduced by reproducing head 72 so that the output of head 72 can be used for monitoring the signals being recorded on tape 30. Since erasing head 82 engages tape 30 outside the portion thereof extending between capstans 20 and 21, the frictional resistance of erasing head 82 to the movement of tape 30 does not influence the tape movement in the portion thereof between capstans 20 and 21, that is, in the portion engaged by the operative recording and reproducing heads 73 and 72. Accordingly, the apparatus according to this invention can employ a standard cassette and provide independent erasing, recording and reproducing heads without sacrificing the stability of tape movement and constant tape tension that are characteristic of dual-capstan tape drives.

When recording of signals on the tape is effected during movement of the tape in the reverse direction, that is, when operation of the apparatus is initiated by actuation of the reverse pushbutton 15 and record pushbutton 11, motor 42 is energized to rotate its shaft in the clockwise direction and thereby to rotate capstans or tape drive shafts 20 and 21 and reel drive shaft 17 in the clockwise direction, as viewed on FIG. 3. Thus, the tape 30 is transported in the left-hand direction, as viewed on FIG. 5, past the windows 25–29 in the side edge wall of cassette 22. During recording with the tape moving in the reverse direction, as described, only the erasing head 98 and the recording head 74 are made operative along with the reproducing or playback head 72. As the tape 30 moves in the left-hand direction, the signals previously recorded on the tape are erased by head 98 prior to the recording of new signals on the tape by head 74, whereupon reproducing head 72 can reproduce or play back the newly recorded signals for monitoring of the latter. It will be apparent that, as described previously in connection with the recording of signals during movement of the tape in the forward direction, erasing head 98 engages the tape 30 in advance of the portion of the tape extending between dual capstans 20 and 21 and thus does not interfere with the stable transportation of the tape and constant tape tension that are characteristic of a dual-capstan tape drive.

Whether the recording operation is effected during driving of the tape in the forward or reverse direction, it will be seen that the operative recording head 73 or 74 and the reproducing head 72, which are readily influenced by variations in the contact force thereof with the magnetic tape 30, are disposed along that portion of the tape between capstans 20 and 21 where the stable tape transportation and constant tape tension characteristic of the dual-capstan drive provide a constant contact force of the heads with the tape. On the other hand, the operative erasing head 82 or 98, which is not readily influenced by variations in the contact force with the magnetic tape, is positioned to engage the tape at a portion thereof which is outside the path of the tape between capstans 20 and 21 so as to avoid any interference with the dual-capstan drive characteristics. It will also be seen that, in the above described embodiment of the invention, the holder for each erasing head 82 or 98 mounted on the pinch roller support arm or lever 78 or 95 has portions, for example, the narrow end portions 90*a* and 90*b* of the flanks 90 of erasing head holder 83, which are insertable with the adjacent pinch roller 79 or 96 into the window 25 or 29 of the cassette 22 for guiding the tape 30 relative to the respective erasing head 82 or 98. Thus, although the standard Philips-type cassette has only the five windows indicated at 25–29, the erasing heads 82 and 98 of the apparatus according to this invention can be readily engaged with the tape in such cassette and made alternatively operative to effectively erase signals on the tape within the cassette while avoiding interference with the dual-capstan tape drive in either the forward or reverse direction.

Although the present invention makes it possible to provide a magnetic recording and reproducing apparatus having a dual-capstan tape drive and being capable of recording signals and monitoring such signals during the drive of the tape in the forward and reverse directions while using a standard tape cassette having only five windows therein, as in the above described embodiment of this invention, the arrangement of each erasing head immediately adjacent a respective one of the pinch rollers associated with the dual-capstans, that is, the essential feature of this invention, can also be applied to a magnetic recording and reproducing apparatus in which recording is effected only during the drive of the tape in one direction, for example, in the forward direction. Thus, as shown schematically on FIG. 8A, a magnetic recording and reproducing apparatus according to this invention for use with a tape cassette 22, as previously described, may drive the tape only in the right-hand direction during the recording and reproducing of signals by means of dual capstans 111*a* and 111*b* having pinch rollers 115*a* and 115*b*, respectively, associated therewith. The apparatus of FIG. 8A is shown to be provided with a reproducing or playback head 114P and a single recording head 114R at the same locations as the heads 72 and 73 of the first described embodiment. In the case of the arrangement shown on FIG. 8A, an erasing head and tape guide combination 114E corresponding to the combination of erasing head 82 and tape guide or head holder 83, is supported on the mounting of the pinch roller 115*a*, while only a tape guide 113 is supported on the mounting of pinch roller 115*b*. Thus, during the movement of the tape in the right-hand direction for recording operation, the tape successively passes the erasing head and guide 114E, the recording head 114R and the reproducing or playback head 114P. Apart from the fact that the arrangement of FIG. 8A can effect recording only during movement of the tape in the forward or right-hand direction, such arrangement has all of the advantages previously discussed in connection with the first described embodiment of this invention.

Referring now to FIG. 8B, it will be seen that, in another embodiment of this invention similar to that described above with reference to FIG. 8A and being also operative to record only during driving of the tape in the right-hand direction, the recording of the signals is effected by a recording head 214R which is located midway between the pinch rollers **215*a* and 215*b* associated with dual capstans 211*a* and 211*b*, and the monitoring of the recorded signals is effected by a head 214P located between head 214R and pinch roller 215*b*. Thus, when the apparatus schematically illustrated on FIG. 8B is employed with a standard tape cassette 22, the recording head 214R is adapted to enter the central window 27 of the cassette while the reproducing or playback head 214P is adapted to enter the window 29. As in the embodiment of FIG. 8A, the arrangement shown on FIG. 8B further includes an erasing head and tape guide assembly or combination 214E associated with the pinch roller 215*a* so as to act on the tape in advance of the portion of the tape extending between dual capstans 211*a* and 211*b*, and a tape guide 213 which is associated with the other pinch roller 215*b***.

Referring now to FIG. 8C, there is schematically illustrated a recording and reproducing apparatus according to still another embodiment of this invention which is effective to record signals, and monitor the recorded signals during driving of the tape in either the forward or reverse direction by means of a dual-capstan tape drive. In the arrangement of FIG. 8C, there is provided a single centrally located recording head 314R located between alternatively operative reproducing or playback heads 314P and 314P' which are also engageable with the tape in a cassette 22 along the portion of the tape extending between the dual capstans **311*a* and 311*b* having the pinch rollers 315*a* and 315*b* respectively associated therewith. In the arrangement of FIG. 8C, an erasing head and tape guiding assembly 314E is associated with the pinch roller 315*a* and a similar erasing head and tape guiding assembly 314E' is associated with the other pinch roller 315*b*. During a recording operation with the tape driven in the right-hand direction, the erasing head of assembly 314E, recording head 314R and the reproducing or playback head 314P are operative, whereas, during recording with the tape being driven in the left-hand direction, the erasing head of assembly 314E' and the reproducing head 314P' are made operative along with the recording head 314R. Thus, the arrangement of FIG. 8C has all of the advantages of the first described embodiment of this invention while employing a single recording head 314R and alternatively operative reproducing heads 314P and 314P' rather than the single reproducing head 72 and the alternatively operative recording heads 73 and 74** of the first described embodiment.

From the above description of several embodiments of this invention, it will be apparent that the arrangement of the recording and reproducing or playback heads engageable with the tape at the portion of the latter between the dual capstans for driving the tape may be varied at will, provided that each erasing head is mounted, preferably on the support for a respective one of the pinch rollers, so as to engage the tape outside of the portion of the latter between the dual capstans.

The above descriptions of the operational characteristics of recording and reproducing apparatus according to this invention have been restricted to the recording mode of operation either in one direction, or in forward and reverse directions, at which time the head carriage 71 is moved rearwardly to its operative position. However, it should be noted that the apparatus according to this invention is free to perform all of the other operational functions normally associated with apparatus of the type to which the invntion relates. Thus, for example, upon actuation of fast-forward control pushbutton 12, head carriage 71 remains in its forward inoperative position while reel drive shaft 18 is suitably driven at a high rotational speed to cause the fast rewinding of the tape on reel 24 and the similar fast unwinding of the tape from reel 23. Similarly, upon the actuation of fast-reverse control pushbutton 16, head carriage 71 remains in, or is moved to its forward inoperative position, and reel drive shaft 17 is rotated at a relatively high rotational speed to cause the fast rewinding of the tape on reel 23. Further, upon the actuation of only the forward control pushbutton 13 or the reverse control pushbutton 15, the head carriage 71 is moved to its rearward operative position and the tape is driven at its normal speed in either the forward or reverse direction with only the reproducing head, or a suitable one of the reproducing heads being rendered operative for playing back signals recorded on the tape.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. An apparatus for magnetically recording and reproducing signals on a magnetic tape, comprising simultaneously operative, spaced apart first and second drive means for transporting the tape at least in the direction from said first drive means to said second drive means in a path having a portion extending between said first and second drive means, each of said drive means including a rotated drive shaft and a pinch roller carried by a movable mounting means for movement against the respective drive shaft with the tape therebetween, at least one magnetic recording head means and at least one magnetic reproducing head means engageable with the tape at spaced locations along said portion of the tape path for respectively recording and reproducing signals on the tape during the transport thereof by said first and second drive means, and at least one magnetic erasing head means carried by said mounting means for the pinch roller of said first drive means and being disposed adjacent said pinch roller of the first drive means at the side of the latter away from said second drive means for engaging the tape simultaneously with said movement of the adjacent pinch roller against said respective drive shaft.

2. An apparatus according to claim 1, in which said recording head means and said reproducing head means are arranged in succession along said portion of the tape path considered in said direction from the first drive means to the second drive means.

3. An apparatus according to claim 2, in which said erasing head means includes a core having a relatively narrow end portion for engagement with the tape immediately adjacent said pinch roller of the first drive means, a relatively wide base portion at said mounting means and an arcuate side surface extending between said end and base portions of the core, and being concentric with said adjacent pinch roller which has its peripheral surface close to said arcuate side surface.

4. An apparatus according to claim 3, further comprising guide means for guiding the tape relative to said erasing head means and said adjacent pinch roller.

5. An apparatus for magnetically recording and reproducing signals on a magnetic tape contained in a cassette including an edge wall having first and second spaced windows and at least third and fourth spaced windows between said first and second windows, with a run of the tape being guided along said edge wall for exposure at the windows therein, said apparatus comprising a chassis having cassette holding means thereon for receiving and positioning a cassette on said chassis, first and second rotatable drive shafts mounted on said chassis for extending into a cassette positioned by said holding means adjacent the tape exposed at said first and second windows, respectively, first and second pinch rollers, movable mounting means carrying said first and second pinch rollers for movement between inoperative positions remote from said drive shafts and operative positions where said first and second pinch rollers reach through said first and second windows of the cassette to engage the tape against said first and second drive shafts for simultaneous transport of the tape by the latter, at least one magnetic recording head means and at least one magnetic reproducing head means located between said first and second pinch rollers and engageable with the tape through the third and fourth windows of the cassette for respectively recording and reproducing signals on the tape as the latter is transported by said drive shafts, and at least one magnetic erasing head means carried by said mounting means adjacent said first pinch roller at the side of the latter facing away from said second pinch roller for engaging the tape through said first window of the cassette simultaneously with the movement of said first pinch roller into said first window.

6. An apparatus according to claim 5, in which said mounting means for the pinch rollers includes a movable carriage carrying both of said pinch rollers and also carrying said recording and reproducing head means.

7. An apparatus according to claim 5, in which said erasing head means includes a magnetic core for engaging the tape and erasing signals recorded in the latter and a head holder receiving the core and having guide means for guiding the tape relative to said core and the adjacent first pinch roller.

8. An apparatus according to claim 7, in which said magnetic core and head holder have a relatively narrow end portion for engagement with the tape immediately adjacent said first pinch roller, a relatively wide base portion at said mounting means and an arcuate side surface extending between said end and base portions and being concentric with said first pinch roller which has its peripheral surface close to said arcuate side surface.

9. An apparatus according to claim 8, in which said end portion of the head holder has flanks extending beyond said end portion of the core to form said guide means.

10. An apparatus according to claim 8, in which said end portion of the core has a curved surface for contact with the tape.

11. An apparatus according to claim 10, in which said curved end surface of the core has a gap therein.

12. An apparatus according to claim 5, further comprising drive means for rotating said drive shafts in the direction to transport the tape in the direction from said first shaft toward said second shaft and said recording head means and said reproducing head means are arranged in succession considered in said direction in which the tape is transported.

13. An apparatus according to claim 12, further comprising guide means for guiding the tape relative to the adjacent first pinch roller, and in which additional guide means are disposed adjacent said second pinch roller.

14. An apparatus according to claim 5, in which said one recording head means is disposed between said one reproducing head means and said first pinch roller, and further comprising a second magnetic recording head means disposed between said reproducing head means and said second pinch roller and being engageable with the tape through a fifth window in the cassette edge wall, a second magnetic erasing head means carried by said mounting means adjacent said second pinch roller at the side of the latter facing away from said first pinch roller for engaging the tape through said second window of the cassette simultaneously with the movement of said second pinch roller into said second window, and reversible drive means for selectively rotating said drive shafts in one direction by which the tape is transported from said first drive shaft toward said second drive shaft while said one erasing, recording and reproducing head means are operative, and in the opposite direction by which the tape is transported from said second drive shaft toward said first drive shaft while said second erasing and recording heads and said one reproducing head are operative.

15. An apparatus according to claim 14, further comprising first and second guide means for guiding the tape relative to the one and second erasing head means and relative to the adjacent pinch roller.

16. An apparatus according to claim 5, in which said one reproducing head means is disposed between said one recording head means and said second pinch roller, and further comprising a second magnetic reproducing head means disposed between said one recording head means and said first pinch roller and being engageable with the tape through a fifth window in the cassette edge wall, a second magnetic erasing head means carried by said mounting means adjacent said second pinch roller at the side of the latter facing away from said first pinch roller for engaging the tape through said second window of the cassette simultaneously with the movement of said second pinch roller into said second window, and reversible drive means for selectively rotating said drive shafts in one direction by which the tape is transported from said first drive shaft toward said second drive shaft while said one erasing, recording and reproducing head means are operative, and in the opposite direction by which the tape is transported from said second drive shaft toward said first drive shaft while said second erasing and reproducing heads and said one recording head are operative.

17. An apparatus according to claim 16, further comprising first and second guide means for guiding the tape relative to the one and second erasing head means and relative to the adjacent pinch roller.

* * * * *